(12) United States Patent
Goyal

(10) Patent No.: US 8,234,107 B2
(45) Date of Patent: Jul. 31, 2012

(54) SUPPLIER DEDUPLICATION ENGINE

(75) Inventor: Ram Dayal Goyal, Bangalore (IN)

(73) Assignee: Ketera Technologies, Inc., Santa Clara, CA (US)

( * ) Notice: Subject to any disclaimer, the term of this patent is extended or adjusted under 35 U.S.C. 154(b) by 938 days.

(21) Appl. No.: 12/029,519

(22) Filed: Feb. 12, 2008

(65) Prior Publication Data

US 2008/0275874 A1    Nov. 6, 2008

(30) Foreign Application Priority Data

May 3, 2007    (IN) .............................. 948/CHE/2007

(51) Int. Cl.
    *G06F 17/28*    (2006.01)
(52) U.S. Cl. ................ 704/4; 707/7; 235/494; 382/181; 704/240; 704/246; 704/9; 715/210; 715/261; 715/822
(58) Field of Classification Search .................. 715/822, 715/210, 261; 704/246, 240, 4, 9; 714/1; 707/7; 235/494; 382/181
    See application file for complete search history.

(56) References Cited

U.S. PATENT DOCUMENTS

| | | | | |
|---|---|---|---|---|
| 5,161,105 | A * | 11/1992 | Kugimiya et al. ................ 704/4 |
| 5,497,486 | A * | 3/1996 | Stolfo et al. ........................... 1/1 |
| 6,016,476 | A | 1/2000 | Maes | |
| 4,374,879 | A1 | 2/2002 | Niwa | |
| 7,054,870 | B2 * | 5/2006 | Holbrook ............................... 1/1 |
| 7,475,343 | B1 * | 1/2009 | Mielenhausen ................ 715/261 |
| 7,540,430 | B2 * | 6/2009 | Jones et al. ..................... 235/494 |
| 7,555,476 | B2 * | 6/2009 | Holbrook ............................... 1/1 |
| 7,577,921 | B2 * | 8/2009 | Zink ............................... 715/822 |
| 7,848,918 | B2 * | 12/2010 | Li et al. ............................... 704/9 |
| 2002/0021838 | A1 * | 2/2002 | Richardson et al. .......... 382/181 |
| 2002/0072974 | A1 | 6/2002 | Pugliese et al. | |
| 2002/0169770 | A1 * | 11/2002 | Kim et al. .......................... 707/5 |
| 2003/0061172 | A1 | 3/2003 | Robinson | |
| 2004/0128282 | A1 * | 7/2004 | Kleinberger et al. ............. 707/3 |
| 2005/0114130 | A1 * | 5/2005 | Java et al. ..................... 704/240 |
| 2006/0080303 | A1 * | 4/2006 | Sargent et al. ..................... 707/3 |
| 2006/0161434 | A1 * | 7/2006 | Faisman et al. ............... 704/246 |
| 2006/0190819 | A1 * | 8/2006 | Ostergaard et al. ........... 715/534 |

* cited by examiner

*Primary Examiner* — Michael Colucci
(74) *Attorney, Agent, or Firm* — Ash Tankha; Lipton, Weinberger & Husick

(57) ABSTRACT

Disclosed herein is a method of grouping similar supplier names together in a database. The syntactical errors in the supplier names are corrected. The supplier names are grouped after correcting the syntactical errors. The abbreviations in the supplier names are captured. The ordering, pronunciation and stemming errors in the supplier names are corrected. A matching algorithm that matches and compares two supplier names is applied that comprises the steps of grouping supplier names based on first set of characters in the supplier names and calculating a matching score between the two supplier using Levenshtein distance between the two supplier names, along with the supplier names' sound codes obtained from a modified metaphone algorithm, length of each word, position of matching and mismatching characters, and stem of words in the supplier names. The matching scores are compared with set thresholds in order to further group the supplier names into clusters.

18 Claims, 22 Drawing Sheets

Matching(Name1, Name2):
  Set Threshold = 0.7;
1. If either of two names has abbreviation then
   a. If there abbreviation is not same then return not matching.
   b. Ignore all trailing words those have length less then 3.
   c. Find score as follows
      i. S = sum of matching score of corresponding words in both names.
      ii. Score = (S+length of abbreviation)/(avg number of words in both names + length of abbreviation – 1);
   d. If score is more than threshold return matching else return not matching.
2. If number of words in names is more than 3 then ignore all trailing words those have length less then 3.
3. If first word of both names are same then
   a. Join all words of both names say J1, J2
   b. Find MatchingScore of J1 and J2)
   c. If score > threshold then return matching;
4. Find Matching Score of all corresponding words in two names.
5. If score of first word match is less than 0.5 return not matching.
6. If score of any word match is < 0.1 then divide score of subsequent matches by 2.
7. PrefinalScore = sum of all scores after above steps;
8. PrefixWordCount = no of initial word having matching score > 0.9;
9. PrefixMatchLen = length of initial word having matching score > 0.9;
10. PrefixMatchScore = PrefixMatchLen/LargerLen;
11. If PrefixWordCount = 1
    a. If PrefixMatchLen > 12 and PrefixMatchScore > 0.5 then wt = 1.0;
    b. Else wt = 0.05;
12. If PrefixWordCount = 2
    a. If PrefixMatchLen > 10 and PrefixMatchScore > 0.5 then wt = 1.5;
    b. Else wt = 0.1
13. If PrefixWordCount > 2
    a. If PrefixMatchLen > 8 and PrefixMatchScore > 0.5 then wt = 2.0;
    b. Else wt = 0.15
14. FinalScore = Final Score/larger of no of words in both names + wt;
15. If FinalScore > threshold then return matching else return not matching.

FIGURE 3C

MatchingScore(Word1,Word2)
1. If word1 is same as word2 return 1.0;
2. If length of either word is less than 4 return 0.0;
3. Find Porter Stem of both word say PS1, PS2
4. Find Sound Code of both PS1, PS2 say S1, S2
5. Find LD = Find Levenshtein Distance between S1 and S2
6. PrefixScore = Length of matching prefix of PS1, PS2/length of larger word
7. SoundScore = Length of matching prefix of S1, S2
8. LDScore = 1-2*LD/length of larger word
9. if Prefix score is > 0.4 return it;
10. if Sound Score is more than 0.4 return it;
11. if LDScore is more than 0.4 return it;
12. return prefix score;

FIGURE 3D

Add2SupplierDedup(supplier, record_id):

1. Find tokens from supplier name using delimiters ("{ }\"\t\n\r,;\V()%|+*$^&@!~:[]#=-<>?.")
2. Get "First Non- Numeric Token" say *token*
3. If length of *token* is one
   a. Set "Abbreviation Flag" true ;
   b. Find remaining part of Abbreviation in ABB.
   c. Find subsequent token *t*;
   d. Handle Apostrophe in *t*
   e. Find *ns* = NumberStem of *t*
   f. If *ns* is not in Commonwords then add to RemainingTokensList
   Else
       If length of *fst* is < 4 and it consists only of consonants then
           set "Abbreviation Flag" true ;
           Assign it to ABB
           Find subsequent token *t*
           Handle Apostrophe in *t*
           Find *ns* = NumberStem of *t*
           If *ns* is not in Commonwords then add to RemainingTokensList
       ELSE
           Handle Apostrophe in *fst*
           Find *ns* = NumberStem of *t*
           If *ns* is not in Commonwords then add to RemainingTokensList
4. Find remaining tokens by adding digits (0123456789) also in delimiters
   a. If length of next token is one ignore it.
   b. Find *ns* = NumberStem of next token
   c. If *ns* is not in Commonwords then add to RemainingTokensList
5. Concatenate all tokens in list using intermediate single space to "clean desc"
6. If "Abbreviation Flag" is true
       Append "ABB" in the beginning of "clean desc" with single space
7. Search clean desc in mapDesc2ClusterInfo
8. If found
   a. Write in FILE1: record_id, supplier name, found record_Id
   Else
   a. Write in FILE1: record_id, supplier name, record_Id, clean desc, ABB Flag
   b. Insert into mapDesc2ClusterInfo the pair (clean desc, record_id);
9. Clear memory occupied by Remaining Token List

FIGURE 5C

GenerateClusterInfoLevel2():

Read lines from FILE1, for each line do
1. Tokenize using tab delimiter
2. If no of token is not 5 then continue
3. Read clean desc, abbreviation flag, record_id level1 from this line
4. Send this info to procedure Add2ClusterLevel2(Supplier, record_id_level1, abbflag)
5. Close FILE1, FILE2

FIGURE 5D

Add2ClusterLevel2(Supplier, record_id_level1, abbflag);

1. Tokenize supplier using space delimiter
2. If AbbFlag is true
       add first token into set of sound of token
     Else
       If(token count = 1)
          Sound = Find Sound Code of first token
          If (Sound's length > 4)
             Add Sound to set of sound of token
          Else
             Add token itself into set of sound of token
3. For all remaining tokens do
     a. Sound = Find Sound Code of token
     b. If( length of Sound > 2)
          Add Sound to set of sound of token
       Else
          Add token itself into set of sound of token
4. Concatenate all elements of set of sound using space, call it SoundString
5. Search SoundString in mapLevelSecond2First
   If(found)
       Write in FILE2TEMP: record_id_level1, found Record_id in map
   Else
       Write in FILE2TEMP: record_id_level1, record_id_level1, supplier, Abbflag
       Add pair (SoundString, record_id_level1) into mapLevelSecond2First

FIGURE 5E

GenerateTempClusterInfoForLevel3()

1. Read each line of FILE2TEMP and do
    a. Find record_id_level2, supplier, Abbflag
    b. Concatenate AbbFlag, record_id to AbbRecord_id_level2
    c. Add AbbRecord_id_level2 into a list
    d. Add supplier into another list
2. Sort two list based one supplier list in increasing order.
3. Write all AbbRecord_id_level2 and corresponding supplier into FILE2
4. Close FILE2TEMP

FIGURE 5F

GenerateClusterInfoLevel3 ()

1. Read each line of FILE2 and do
    a. Extract, Abb Flag, Supplier, Record_id_level2
    b. Send to Add2ClusterLevel3(supplier, Record_id_level2, AbbFlag)
2. ProcessCurrentGroup()
3. For all elements in CurrentGroup do
       Write in FILE3: Record_id_Level2, Record_id_level3
4. Clear group.
5. Close FILE2
6. Close FILE3

FIGURE 5G

Add2ClusterLevel3(supplier, Record_id_level2, AbbFlag)

Create two list SupplierTokenList, SupplierSoundTokenList
Tokenize supplier using space delimiter
If (AbbFlag is true)
        Add first token into SupplierTokenList
        Add first token into SupplierSoundTokenList
For all tokens do
        Find soundCode of next token
        If(soundCode has length = 1)
                soundCode = token
        Add token into SupplierTokenList
        Add soundCode into SupplierSoundTokenList Word1 = Find first word of last supplier in the group
Word2 = Find first word of supplier If CanBeGrouped(Word1, Word2)
        Add SupplierTokenList to Group
        Add SupplierSoundTokenList to Group
        Add Record_id_level2 to group
        Add AbbFlag to group
Else
        ProcessCurrentGroup();
        Write in FILE3: record_id_level2, record_id_level3 from group
        Clear Group
        Add SupplierTokenList to Group
        Add SupplierSoundTokenList to Group
        Add Record_id_level2 to group
        Add AbbFlag to group

FIGURE 5H

Boolean CanBeGrouped(Word1, Word2)

Find smaller length of word1, word2 into *minLen*
Find length of longest prefix match between word1, word2 into *prefixLen*
If(*prefixLen* >3) return true;
If(prefixLen/minLen) > 0.5 then return true;
Return false;

FIGURE 5I

ProcessCurrentGroup()

1. Traverse all suppliers in the group
2. SupplierOne = next supplier
3. If(CurrentSupplier has been matched with any one)
   Traverse all supplier next to CurerntSupplier, those have not been matched with any one
   a. SupplierTwo = next supplier
   b. Find *MatchingScore* of SupplierOne, SupplierTwo using SupplierMatchScore
   c. If(*MatchingScore* > *threshold_level3*)
      Update record_id_level3 of SupplierTwo with that of SupplierOne;
      Update record_id_level4 of SupplierTwo with that of SupplierOne;
   d. Else If(*MatchingScore* > *threshold_level4*)
      Update record_id_level4 of SupplierTwo with that of SupplierOne;
   e. If 10 consecutive suppliers don't get *MatchingScore* > *threshold* then go to 1;
4. Else (Current supplier has not been matched with some other)
   Traverse all supplier next to CurerntSupplier, those have not been matched with any one
   a. SupplierTwo = next supplier
   b. Find *MatchingScore* of SupplierOne, SupplierTwo using SupplierMatchScore
   c. If(*MatchingScore* > *threshold_level3*)
      i. Update record_id_level3 of SupplierTwo with that of SupplierOne
      ii. Update record_id_level4 of SupplierTwo with that of SupplierOne;
   d. Else If(*MatchingScore* > *threshold_level4*)
      i. Update record_id_level4 of SupplierTwo with that of SupplierOne;
   e. If 10 consecutive supplier don't get *MatchingScore* > *threshold* then go to 1;

FIGURE 5J

SupplierMatchScore(Supplier1, Supplier2, Sound1, Sound2, AbbAflag1, AbbFlag2)
Supplier1 = list of tokens of Supplier 1;Supplier2 = list of tokens of Supplier 2;
Sound1 = list of sound of tokens of Supplier 1;Sound2 = list of sound of tokens of Supplier 2;
maxSize = maximum(no of tokens in Supplier1, no of tokens in Supplier2);
Case1: Both Supplier1, Supplier2 consists of only one word
    If(AbbFlag1 or AbbFlag 2 is true)
        If(Supplier1 == Supplier2) return 1.0;
        Else return 0.0;
    Else
        Score = FuzzyMatchSizeOne(Supplier1, Supplier2, Sound1, Sound2);
        Return Score;
Case2: if(AbbFlag1 and AbbFlag2 both are true)
        If(first token of both supplier not matching) return 0.0;
        Score = 0.0;
        For all tokens in supplier1, supplier2
          Score = Score + FuzzyMatchTwoString(token1, token2,
        soundToken1, soundToken2)
        Small = Find no of tokens in supplier1, supplier2 those are of length < 3
        If(Small > 0)
            maxSize = maxSize – 1;
        avgSize = (minSize + maxSize)/2
        FinalScore = (Score + length of Abb1)/(avgSize + length of Abb1 – 1);
        Return FinalScore
FirstWord1 = First Word of Supplier1
FirstWord2 = First Word of Supplier2
FirstSound1 = First Token of Sound1
FirstSound2 = First Token of Sound2
If(
    (FirstWord1 starts with FirstWord2) or
    (FirstWord2 starts with FirstWord1) or
    (FirstSound1 starts with FirstSound2) or
    (FirstSound2 starts with FirstSound1)
)
    fullOne = Concatenate all tokens of Supplier1
    fullTwo = Concatenate all tokens of Supplier2
    LD = FindLevenshteinDistance(fullOne, FullTwo)

If(LD < 2 return 0.8;

minFullLen = minimum(fullOne Length,
    score = 1.0 - (2 * LD)/minFullLens
    if(score > 0.7) return score

 FIGURE 5K^A

```
    For all tokens till minSize do
        Score[token] = FuzzyMatchTwoString(token1, token2, soundToken1,
    soundToken2)
    If score of some Token is 0.0
        Score of all subsequent token is halved.

FinalScore = sum of all token's score;

PrefixMatchCount = Largest number of initial tokens with matching score > 0.9
    PrefixMatchLen = Sum of length of initial tokens with matching score > 0.9 maxFullLen = Maximum(fullLenOne, fullLenTwo);
ExtraWt = 0.0;
If (PrefixMatchCount = 1)
        PrefixMatchScore = PrefixMatchLen/maxFullLen
        if(PrefixMatchScore > 0.5 and PrefixMatchLen > 12)
                ExtraWt = 1.0;
        else
                ExtraWt = 0.05;
Else
If (PrefixMatchCount = 2)
        PrefixMatchScore = PrefixMatchLen/maxFullLen
        if(PrefixMatchScore > 0.5 and PrefixMatchLen > 10)
                ExtraWt = 1.5;
        else
                ExtraWt = 0.1;
Else
If (PrefixMatchCount > 2)
        PrefixMatchScore = PrefixMatchLen/maxFullLen
        if(PrefixMatchScore > 0.5 and PrefixMatchLen > 8)
                ExtraWt = 2.0;
        else
                ExtraWt = 0.15;

If (PrefixMatchCount > 0)
        CountSmall = find tokens those consists of only two characaters
If(CountSmall > 0)
        maxSize = maxSize - 1;

finalScore = (finalScore/maxSize) + wt;
return finalScore
```

FIGURE 5K^B

```
Double FuzzyMatchTwoString(One, Two, Sound1, Sound2)
If(one = two) return 1.0;
If(sound1 = sound2)
        If(length of sound1 > 3) return 0.8;
        Else return 0.7;
Len1 = Length of One;
Len2 = Length of Two;

If (Len1 > 4 or Len2 > 4)
        PS1= Find PorterStem of One
        PS2 = Find PorterStem of Two
        PSLen1 = length of PS1
        PSLen2 = length of PS2
        MaxLen2 = maximum(PSLen1, PSLen2)

LDScore = 1.0 – 2* LD/MaxLen2
        If(LDScore > 0.4
                return LDScore;
        PrefixScore = (Length of largest matching prefix of PS1, PS2)/ MaxLen2
        if (PrefixScore > 0.4)
                return prefixScore;
        If(Len of largest matching prefix of Sound1, Sound2 is > 3)
         PrefixSoundScore = (Len of largest matching prefix of Sound1,
Sound2)/Len of Sound2
        If(PrefixSoundScore > 0.4)
                return PrefixSoundScore;
        Else
                Return return prefixScore;
Else
        Return 0.0;
```

FIGURE 5L

Double FuzzyMatchSizeOne(One, Two, Sound1, Sound2)
If(one = two) return 1.0;
If(sound1 = sound2)
    If(length of sound1 > 3) return 0.8;
    Else return 0.7;
Len1 = Length of One;
Len2 = Length of Two;

If (Len1 > 4 or Len2 > 4)
    MaxLen2 = maximum(Len1, Len2)

LDScore = 1.0 – 2* LD/MaxLen2
    If(LDScore > 0.4
        return LDScore;
    PrefixScore = (Length of largest matching prefix of One, Two)/ MaxLen2
    if (PrefixScore > 0.4)
        return prefixScore;
    If(Len of largest matching prefix of Sound1, Sound2 is > 3)
     PrefixSoundScore = (Len of largest matching prefix of Sound1, Sound2)/Len of Sound2
    If(PrefixSoundScore > 0.4)
        return PrefixSoundScore;
    Else
        Return return prefixScore;
Else
    Return 0.0;

FIGURE 5M

| RECORD ID | SUPPLIER NAME | LEVEL-1 | LEVEL-2 | LEVEL-3 | LEVEL-4 |
|---|---|---|---|---|---|
| R1 | Asdwe32 | R1 | R1 | R1 | R1 |
| R2 | Sasdasd | R1 | R1 | R1 | R1 |
| R3 | Asdasda | R2 | R2 | R1 | R1 |
| R4 | Asdasda | R3 | R2 | R1 | R1 |
| R5 | Asdasdada | R4 | R3 | R2 | R5 |
| R6 | ZxZxZsqww | R4 | R3 | R2 | R5 |

FIGURE 6

SUPPLIER DEDUPLICATION ENGINE

BACKGROUND

This invention in general relates to processing data and specifically relates to deduplication and grouping of similar supplier names in a database.

When an organization procures a product or service, typically the entry is made into a table called a spend table. The spend table contains the product or service description, spend amount, date, supplier name etc. For the analysis of spend data, there is a need to identify a particular supplier or find the list of top 'n' suppliers. Since all entries in the table are normally entered manually; often the same supplier may inadvertently be entered in a different manner at different places in the table. Such duplicated entries result in aggregation of redundant data by having multiple accounts of the same supplier. Proportions of duplicative data and the associated problems increase with the increase in the number of entries in the spend table. Manual grouping is labor intensive and time consuming. Furthermore, once the grouping is finished, the table is outdated. When fresh entries are added to the table, they are not grouped during entry. Hence, even after all the effort put into manual grouping, the problems of duplicative data still prevail.

To ensure that duplication of a supplier's name does not occur, it is necessary to check the supplier's name against all the name entries in the spend table. If there are 'n' supplier names, then to ensure non-duplication of the 'n' names it maybe necessary to check each supplier's name with all the remaining supplier names. This checking technique requires considerable time because of the n squared matches.

Hence, there is a need for a computerized system that automatically handles the above stated problems and effectively groups similar supplier names. The system has to address all the inadvertent mistakes that are due to typing or spelling. The system, also, should not group the supplier names which seem to have small differences but are dissimilar in reality, for example KBC TV, NBC TV. The system has to improve the deduplication and achievable grouping performance in addition to reducing time taken for the same.

SUMMARY OF THE INVENTION

Disclosed herein is a method that addresses and provides solutions to the above stated problems by implementing an effective deduplication process.

Disclosed herein is a method for grouping similar supplier names in a plurality of supplier names in a database. The syntactical errors in the supplier names are corrected. The supplier names are grouped after correcting the syntactical errors. The abbreviations in the supplier names are captured. The ordering, pronunciation and stemming errors in the supplier names are corrected. A matching algorithm that matches and compares two supplier names is applied that comprises the steps of grouping supplier names based on first set of characters in the supplier names and calculating a matching score between the two supplier names using Levenshtein distance between the two supplier names, along with the supplier names' sound codes obtained from a modified metaphone algorithm, length of each word, position of matching and mismatching characters, and stem of words in the supplier names. The matching scores are compared with set thresholds in order to further group the supplier names into clusters. Many levels of hierarchical grouping are created. The first three levels do not require manual intervention for verification. An additional fourth level is employed that requires manual intervention for verification of accuracy in grouping.

In the present invention the supplier's names are arranged into small sub groups. In deduplication such grouping eliminates unnecessary matches, and thereby, the matching process becomes time-efficient. The time efficiency is achieved by eliminating the problem of n squared matches, previously mentioned.

Another advantage is that the present invention handles all the obvious errors that are due to typing or spelling. Also different suppliers whose names seem to have small differences, for example KBC TV, NBC TV, are not grouped together.

Another advantage of the present invention is that it makes the program extremely efficient by employing a super efficient data structure. While implementing the algorithms, a data structure is selected and implemented, at each step in the algorithms, that is theoretically or optimally the most efficient. Such careful selection of a data structure at each step in the algorithms gives a multifold increase in speed and performance.

BRIEF DESCRIPTION OF THE DRAWINGS

The foregoing summary, as well as the following detailed description of the embodiments, is better understood when read in conjunction with the appended drawings. For the purpose of illustrating the invention, there is shown in the drawings exemplary constructions of the invention; however, the invention is not limited to the specific methods and instrumentalities disclosed.

FIG. 3C illustrates an exemplary algorithm for 'Matching (Name1, Name2)' API.

FIG. 3D illustrates an exemplary algorithm 'MatchingScore(Word1,Word2)' algorithm.

FIG. 5C illustrates an exemplary algorithm for the Add2SupplierDedup(supplier, record_id) API.

FIG. 5D illustrates an exemplary algorithm for the GenerateClusterInfoLevel2( ) API.

FIG. 5E illustrates an exemplary algorithm for the Add2ClusterLevel2(Supplier, record_id_level1, abbflag) API.

FIG. 5F illustrates an exemplary algorithm for the GenerateTempClusterInfoForLevel3( ) API.

FIG. 5G illustrates an exemplary algorithm for the GenerateClusterInfoLevel3 ( ) API.

FIG. 5H illustrates an exemplary algorithm for the Add2ClusterLevel3(supplier, Record_id_level2, AbbFlag) API.

FIG. 5I illustrates an exemplary algorithm for the Boolean CanBeGrouped(Word1, Word2) API.

FIG. 5J illustrates an exemplary algorithm for the ProcessCurrentGroup( ) API.

FIG. 5K^A and FIG. 5K^B illustrate an exemplary algorithm for the SupplierMatchScore(Supplier1, Supplier2, Sound1, Sound2, AbbAflag1, AbbFlag2) API.

FIG. 5L illustrates an exemplary algorithm for the FuzzyMatchTwoString(One, Two, Sound1, Sound2) API.

FIG. 5M illustrates an exemplary algorithm for the FuzzyMatchSizeone(One, Two, Sound1, Sound2) API.

FIG. 6 illustrates an exemplary output of the supplier deduplication engine.

DETAILED DESCRIPTION OF THE DRAWINGS

Figure 1:
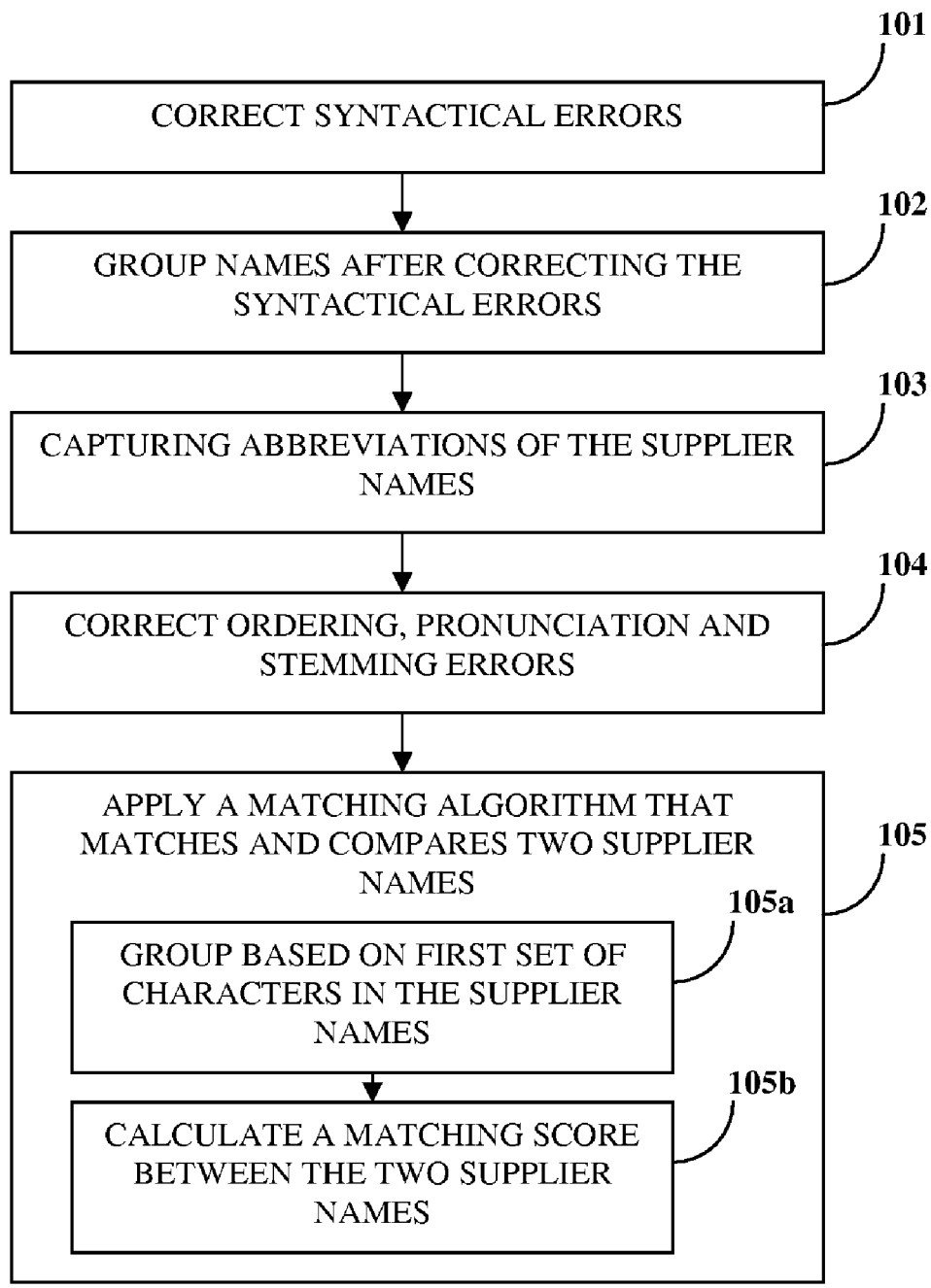
FIG. 1 illustrates the method of grouping similar supplier names.

FIG. 1 illustrates the method of grouping similar supplier names together from a plurality of supplier names in a database using a supplier deduplication engine (SDE). The SDE can be run independent of the characteristics or type of database to group similar supplier names. The supplier names with their corresponding record identifiers are entered into a 'spend' database. The syntactical errors that may occur while entering the supplier names into the database are corrected 101. The supplier names are grouped 102 in clusters after correcting the syntactical errors. The abbreviations in the supplier names entered are captured 103. The ordering, pronunciation and the stemming errors in the supplier names are then corrected 104. A matching algorithm is applied 105 that consecutively matches and compares two supplier names until all the supplier names entered are processed. The matching algorithm includes the steps of grouping supplier names based on the first set of characters in the supplier names 105a and calculating a matching score 105b between the two supplier names using Levenshtein distance between the two supplier names, along with the supplier names' sound codes obtained from a modified metaphone algorithm, length of each word, position of matching and mismatching characters, and stem of words in the supplier names. The matching scores are compared with set thresholds in order to further group the supplier names into clusters. As an additional step, manual intervention can be applied to verify the accuracy in grouping, identify any missed probable match, and make a final decision in grouping the supplier names. While implementing all the algorithms, a data structure is selected and implemented, at each step in the algorithms, that is theoretically or optimally the most efficient.

Subgroups are created for suppliers to avoid the problems associated with squared n matching. Moreover, the matching process for determining supplier name matches among each group, involves the checking of consecutive matches and mismatches. This matching process significantly increases the speed of the execution of the deduplication algorithms. For example, the matching score for two abbreviations, two words and two sound codes is calculated by using entirely different equations for each of them.

Figure 2:
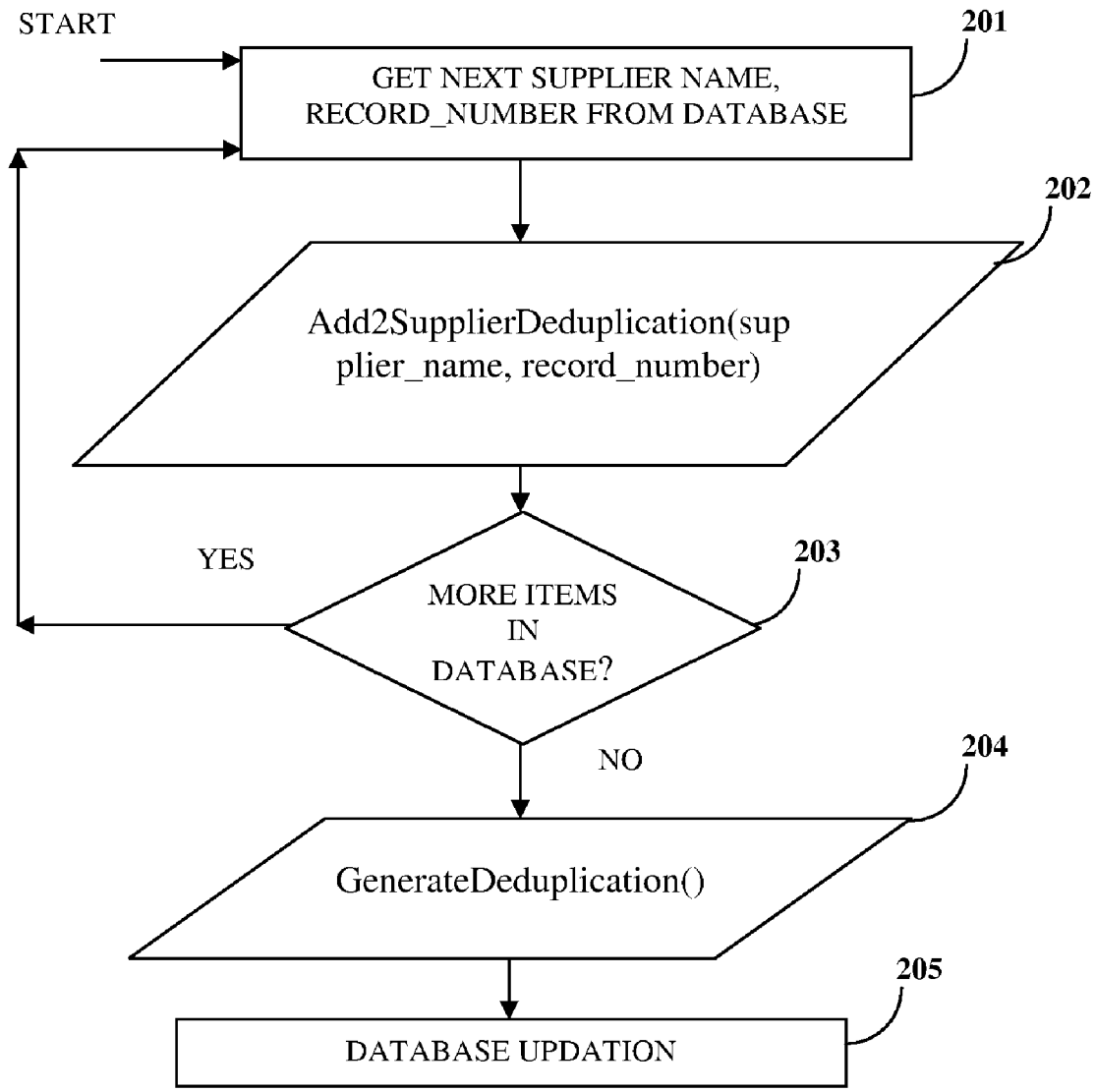
FIG. 2 illustrates an exemplary flow diagram of the deduplication process.

FIG. 2 illustrates an exemplary flow diagram of the deduplication process. When all the supplier names and their corresponding record identifiers are entered into the database, the supplier deduplication engine (SDE) can be run on the database to avert any duplication of the supplier names due to unintentional mistakes when entering the supplier names. During the entry process, the same supplier name may be, inadvertently, entered twice or the name entered may be already present in the database but is not recognized due to a slight mismatch in the names. The SDE averts all such errors by the deduplication process. The SDE also ensures that two supplier names that are intended to be different but have trivial differences in the characters or words of the names are not grouped together. The SDE collects the supplier names in the database with corresponding record numbers one after the other 201. An application programming interface (API) "Add2SupplierDeduplication(supplier_name, record_number)" 202 prepares the entries as suitable inputs for deduplication. The SDE verifies whether or not all the entries of the database are collected and prepared 203. The "GenerateDeduplication( )" API performs the deduplication process on all the entries of the database 204. After the deduplication process is complete and all the entries are verified, if required, manually for any mismatch, the database is updated 205 according to the outcome of the deduplicaton process. The updation is dependent on the deduplication process as the deduplication outcome may vary, in terms of the number of groups, for every subsequent process of entry, even if the number of entries is equal.

Figure 3A:
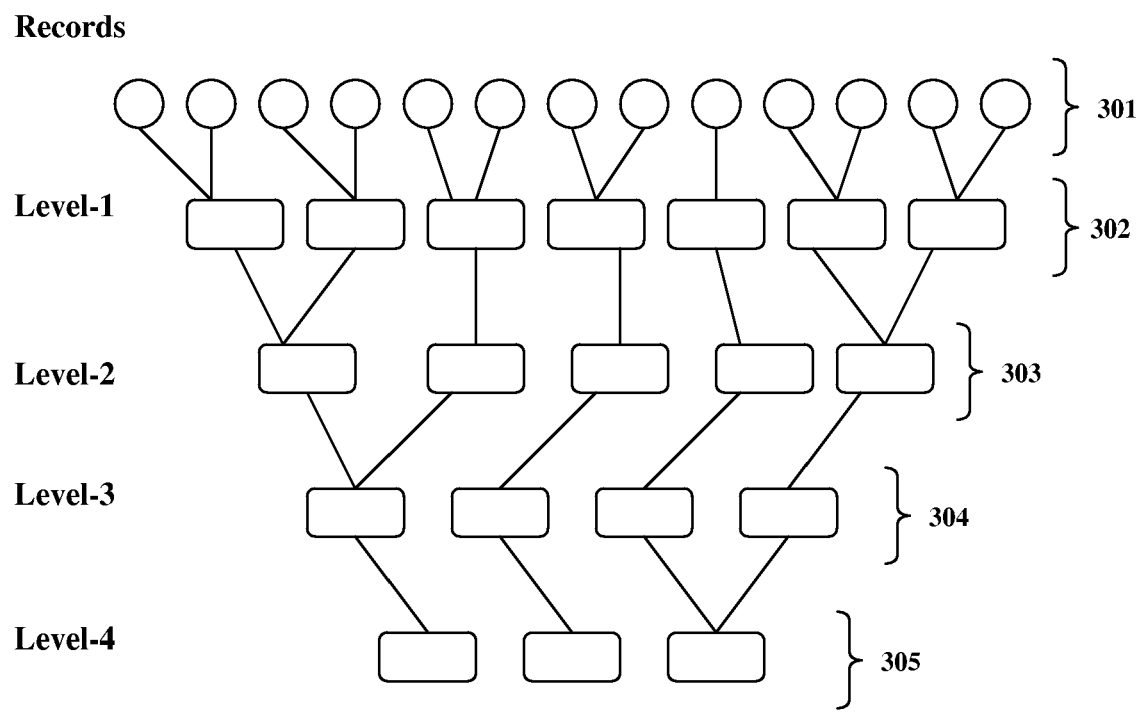
FIG. 3A illustrates the exemplary levels in the deduplication process.

FIG. 3A illustrates the exemplary levels in the deduplication process. In an embodiment, four levels in the deduplication process are considered, although any number of levels may be incorporated in the deduplication process. The first level 302 comprises the following steps: All the supplier name records 301 are given original record identifiers (IDs) during entry into the database. The original record IDs are assigned as the first level IDs for all the entries. The single quotes in the supplier names are replaced by apostrophes. 'String HandleApostrophe(String)' module removes unwanted (not significant) parts of a word if they contain apostrophes or single quotes. All the occupancy usage apostrophes in the supplier names are removed. For example, consider an entry: Tom's computer. The apostrophe is removed to make the entry: Tom computer. Similarly all other punctuations are handled. The supplier names are parsed using all non-alphanumeric symbols. All the first numeric tokens in the supplier names are ignored. If the first word of the supplier name has only a single letter, then the entered name is considered an abbreviation or the first word is considered as an abbreviation. Also, if the first word of the supplier name has less than four characters that are all consonants, then a part of the name is an abbreviation or the name has an abbreviation. If the name has an abbreviation, then the abbreviation is extracted. If the remaining words in the name belong to the following 'StopWordList', then those remaining words are ignored.

StopWordList: group, parking, inc, incorp, incorpor, incorporated, incorporation, llc, llp, ltee, liability, plc, international, tech, technology, srv, serv, srvc, service, corp, corporation, corporated, supp, supply, sply, pty, pvt, private, ltd, limited, co, comp, company, enter, enterprise, enterprize, assoc, association, indus, industry, of, the, and, for.

The second level 303 comprises the following steps: The first level IDs are assigned to the entries as second level Ids. Sorted sound codes for all the names after first level are determined. Sound Code for a word is the code that is generated by analyzing its pronunciation. A standard metaphone algorithm is modified during adaptation and the modified metaphone algorithm is used for finding sound code for the words. If a name has an abbreviation, then the word (as an abbreviation) is considered for the matching algorithm, otherwise the sound code for that word is determined. Similarly, the sound codes for all words in the supplier name are determined and considered. The sound codes of all the words are arranged in ascending order. The sound codes are then concatenated into a single string. The supplier names with the same sorted sound code are assigned the same second level ID; otherwise the first level ID is assigned as the second level ID for the supplier names.

The third level 304 comprises the following steps. The supplier names are sorted in alphabetical order and are grouped into subgroups. While creating a group at the third level, an empty group, i.e., a group with no elements is initiated. If at least the first three characters of two consecutive supplier names match, then those supplier names are grouped into the same subgroup. If no more matches are possible for a particular subgroup, that subgroup is processed and formation of another subgroup is initiated. Processing a subgroup implies executing the algorithm "ProcessingGroup".

The fourth level 305 comprises determining probable match which may require manual verification. In the fourth level, accuracy depends upon data and real life represented by the data. The threshold for matching scores of the third level data may be fixed based on manual verification of the data. For example, for the supplier names that have matching score between 0.5-0.7, the same fourth level ID are assigned. ID assignment based on such thresholds may be useful considering the following kind of examples: "American Express", "American Air Lines" and "American Petroleum" in reality represent different entities, although a significant part of the names match. Contrastingly, "Microsoft SF" and "Microsoft San Francisco" represent the same entity in spite of the name difference. By keeping a low threshold, 'Microsoft SF' and 'Microsoft San Francisco' will become part of the same group or cluster, which in reality is true. But the low threshold would also lead to grouping of "American Express", "American Air Lines" and "American Petroleum". A final decision in such contradictory cases may be taken by the user (human knowledge). This will ensure that the matching algorithm will capture almost all duplicate supplier names.

Figure 3B:
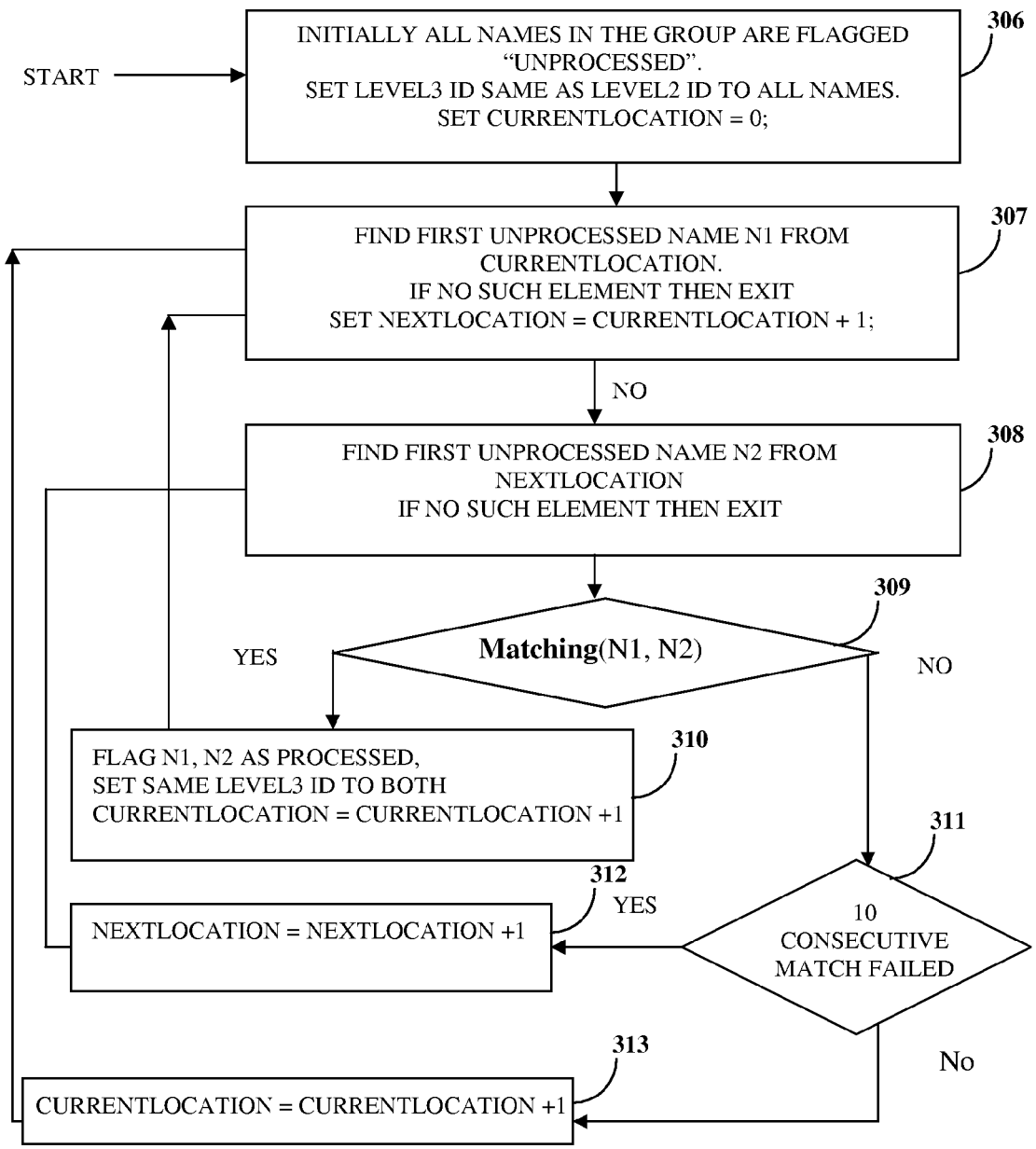
FIG. 3B illustrates an exemplary flowchart for the "ProcessingGroup" algorithm.

FIG. 3B illustrates an exemplary flowchart for the "ProcessingGroup" algorithm employed during the transition from the second level to the third level in the deduplication process. Initially all the supplier names in the third level are flagged as 'unprocessed' 306. The second level IDs are assigned as third level IDs to the supplier names 306. The processing is started from the initial location by setting the 'CurrentLocation' to zero 306. All the unprocessed supplier names are processed in all the locations by incrementing the 'CurrentLocation' sequentially 307, until all the supplier names are compared with the supplier names in the 'NextLocation'. 'CurrentLocation' and 'NextLocation' are pointers or indexes to distinct supplier names, after second level grouping, used for finding possible groups for the third level. The comparison is carried out by an algorithm 'Matching(N1,N2)', where 'N1' is the first unprocessed supplier name in 'CurrentLocation' 307 at any point in the execution of the "ProcessingGroup" algorithm, and 'N2' is the first unprocessed supplier name in the 'NextLocation' 308 at any point in the execution of the "ProcessingGroup" algorithm. Once the supplier names are processed, the supplier names are flagged as 'processed'. If at least the first three characters in any comparison of the supplier names are matching 309, then those supplier names are assigned the same third level ID 310. If ten consecutive supplier names do not get a matching score that is greater than the threshold, and the matches fail 311, the execution jumps to step 307 after incrementing the 'CurrentLocation' by one 313. FIG. 3C illustrates an exemplary algorithm for 'Matching(N1,N2)' API. The threshold for the 'Matching(N1,N2)' algorithm is set at 0.7. FIG. 3D illustrates an exemplary algorithm 'MatchingScore(Word1,Word2)' algorithm that is executed on each word of the supplier names. The 'MatchingScore(Word1,Word2)' algorithm is called in 'Matching(N1,N2)' algorithm and the returned result is utilized in the 'Matching(N1,N2)' algorithm. The 'Porter Stem' includes the combination of the root of a word and the derivational affixes. The Porter Stem algorithm determines the stem for different forms of a word. For example "paint" is the stem for the words "painting, painted, painter, paints etc". The Levenshtein distance between two strings is the minimum number of operations that need to be carried out in order to transform one string into another. The operations may comprise insertion, deletion, or substitution of a single character. For example, the Levenshtein distance between the words "Harry" and "Mary" would be two.
1. Harry-Marry (Substitute 'H' with 'M')
2. Marry-Mary (delete 'R').

Figure 4:
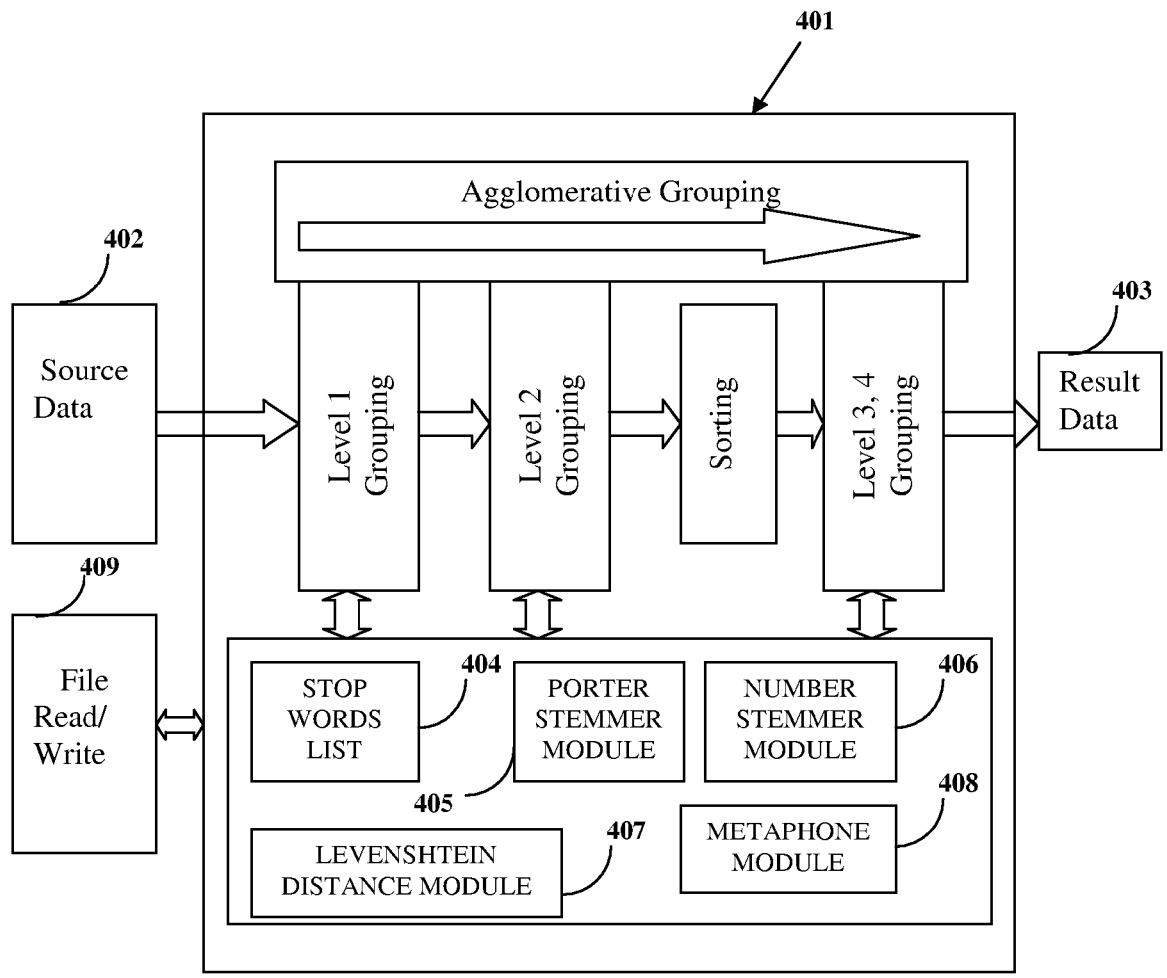
FIG. 4 illustrates a block diagram representation of the architecture of the supplier deduplication engine.

FIG. 4 illustrates a block diagram representation for the architecture of the supplier deduplication engine 401. A file read/write module 409 reads the source data 402 from a file and writes the processed or result data 403 to the file. The grouping of supplier names is agglomerative, i.e. similar supplier names are grouped and the sizes of the groups increase with entries, over the four levels of grouping. The supplier deduplication engine 401 comprises processing modules utilized for pre-grouping, grouping and post-grouping tasks. The 'StopWordList' 404 includes words and characters that are redundant for grouping algorithms. The 'StopWordList' 404 is referred for such words and characters in the supplier names. "Number Stemmer" 406 is a module which converts word plurals to singulars. For example "computers" is converted to "computer". 'Porter Stemmer' module 405 determines the stem for different forms of a word. Levenshtein distance module 407 determines the edit distance between two strings i.e. the minimum number of operations that need to be carried out in order to transform one string into another. The 'Metaphone' algorithm module 408 determines the sound codes for the words in the supplier names.

Figure 5A:
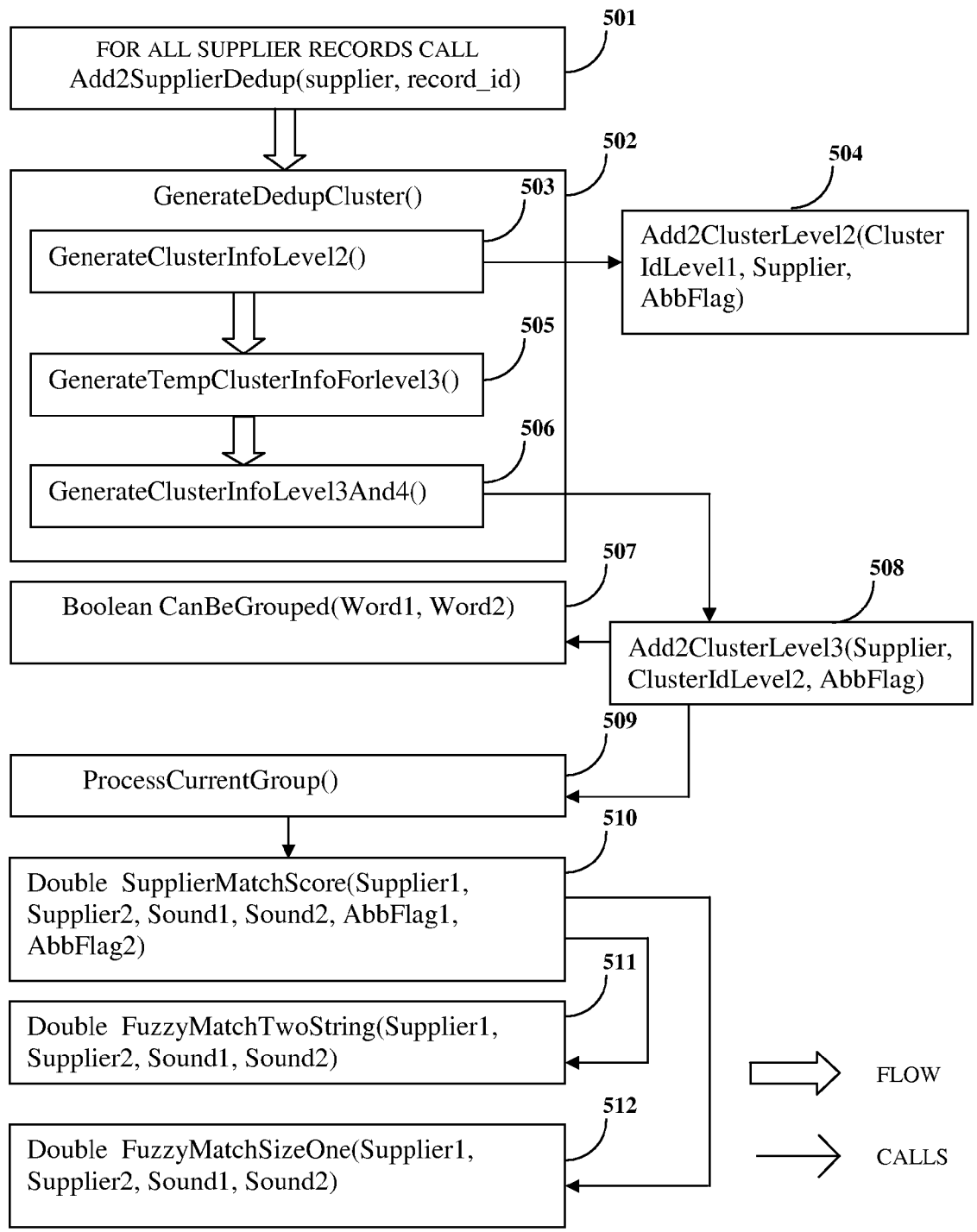
FIG. 5A illustrates an exemplary flowchart of the API call diagram.

FIG. 5A illustrates an exemplary flowchart of the API call diagram. The 'Add2SupplierDedup(supplier, record_id)' API 501 is called for all the supplier names in the database. The supplier names with record IDs are passed as arguments to the 'Add2SupplierDedup(supplier, record_id)' API. This API is followed by the execution of another API 'GenerateDedupCluster ( )'. The 'GenerateDedupCluster ( )' API 502 comprises three more API's that are executed in different levels of FIG. 3A. The 'GenerateClusterInfoLevel2( )' API 503 calls the 'Add2ClusterLevel2(ClusterIdLevel1, Supplier, AbbFlag)' API 504 to generate sound codes for the words in the supplier names and searches the sound string after concatenation in the database map 'mapLevelSecond2 First'. The 'GenerateClusterInfoLevel2( )' API 503 is followed by the 'GenerateTempClusterInfoForlevel3( )' API 505 that generates two lists comprising the concatenated information of the abbreviation flag and the record ID in one list and the supplier names in another list. The two lists are sorted based on supplier names in increasing order. The 'GenerateClusterInfoLevel3And4( )' API 506 extracts the abbreviation flag, supplier name and record IDs of level two and calls the two API's 'Boolean CanBeGrouped(Word1, Word2)' 507 and 'ProcessCurrentGroup( )' 509. The API 'Boolean CanBeGrouped(Word1, Word2)' 507 determines whether or not the words or the arguments 'Word1' and 'Word2' can be grouped. The 'ProcessCurrentGroup( )' API 509 matches and groups suppliers according to the returned result of the API 'SupplierMatchScore(Supplier1, Supplier2, Sound1, Sound2, AbbFlag1, AbbFlag2)' 510. The 'SupplierMatchScore(Supplier1, Supplier2, Sound1, Sound2, AbbFlag1, AbbFlag2)' API 510 again calls 'FuzzyMatchTwoString(Supplier1, Supplier2, Sound1, Sound2)' API 511 by passing two tokens and two sound tokens of two supplier names as arguments. The 'SupplierMatchScore(Supplier1, Supplier2, Sound1, Sound2, AbbFlag1, AbbFlag2)' further calls FuzzyMatchSizeone(Supplier1, Supplier2, Sound1, Sound2) API 512 by passing a list of tokens of two supplier names and a list of sound of tokens of two supplier names as arguments.

Figure 5B:
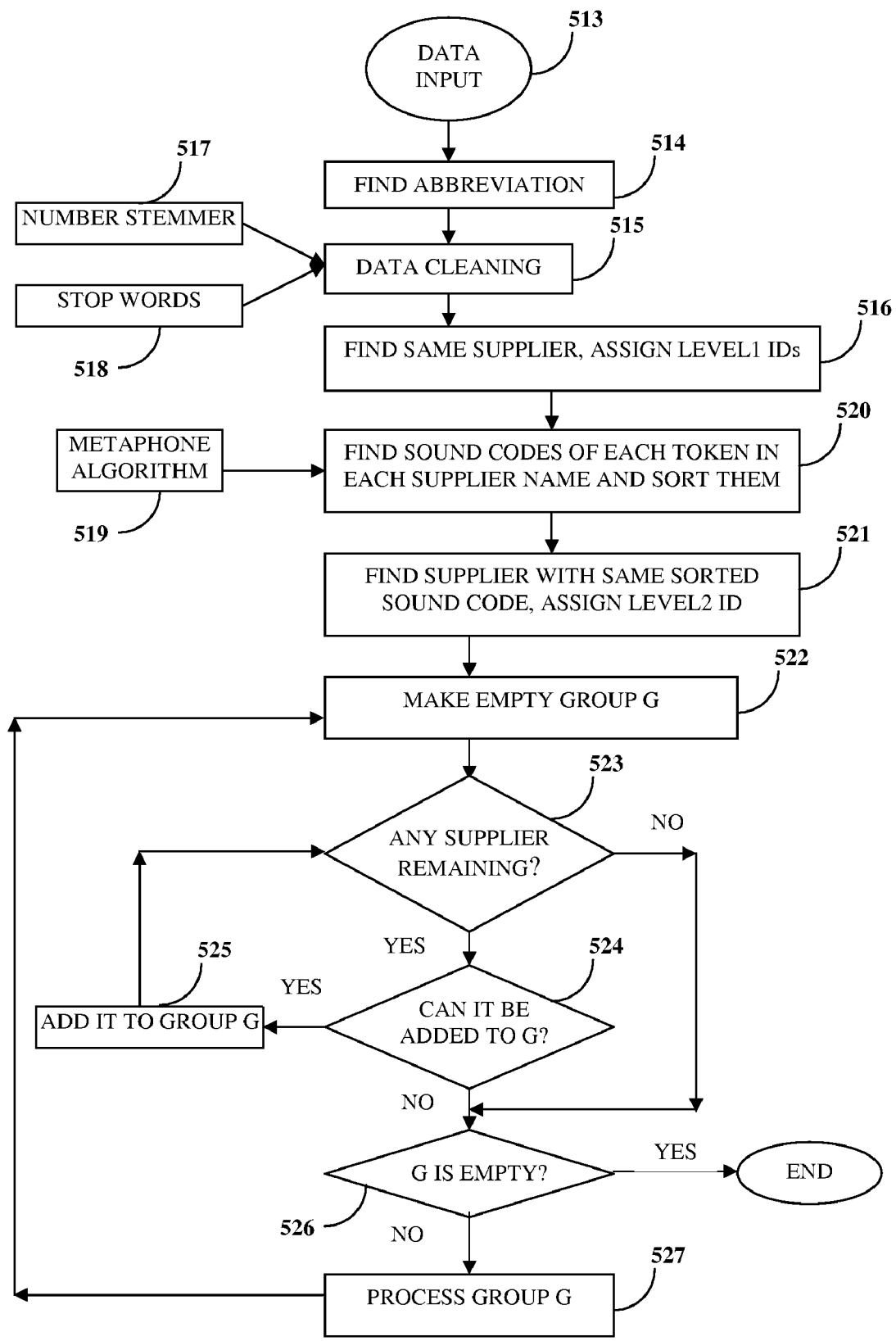
FIG. 5B illustrates a block diagram representation for the algorithms and the logic flow across the algorithm blocks.

FIG. 5B illustrates a block diagram representation for the algorithms and the logic flow across the algorithm blocks. The data containing the supplier details is inputted 513 to the supplier deduplication engine. The abbreviations in the supplier names are determined 514. The data is cleaned 515 by implementing 517 the 'Number Stemmer' algorithm and referring 518 to the 'StopWord' list. Identical supplier names are assigned the same first level ID 516. The sound code for each token of each supplier name is determined 520 using the 'Metaphone' algorithm 519 and the determined sound codes are sorted 520. The supplier names with identical sorted sound codes are determined 521 and assigned the same second level ID. Empty groups are created 522 and the remaining supplier names 523 are sorted and added 525 into the created groups, in iterations, until all supplier names are exhausted. This sorting is based on 524 the similarities of these supplier names. If a group is not empty 526 after sorting the supplier names, the current group is processed 527.

FIG. 5C illustrates an exemplary algorithm for the Add2SupplierDedup(supplier, record_id) API. FIG. 5C describes the pseudo code for block 501 of FIG. 5A. The Add2SupplierDedup ( ) API takes raw supplier name, tokenizes it, determines the stem of each token, performs basic cleaning and determines the abbreviations. In the first level of the deduplication process, all suppliers' names are assigned with the original record IDs. The suppliers' names are parsed using non-alphanumeric symbols. All the first numeric tokens in the supplier names are ignored. Tokens from supplier names are determined using delimiters ("{ }\"'\t\n\f,;\V( )%|+ *$^&@!~:[ ]#=< >?."). If the token has only a single letter then the entered name is considered an abbreviation or the name has an abbreviation. Also if the token has less than four characters that are consonants, then the name is considered an abbreviation or the name has an abbreviation. Then, the abbreviation flag is set to true and the remaining abbreviation is extracted. All the occupancy usage apostrophes in the subsequent tokens are removed. The remaining words in the supplier name if occurring in the 'StopWordList', are ignored. All the tokens in plural form are converted to singular forms. The abbreviations are concatenated and the remaining token list is cleared.

FIG. 5D illustrates an exemplary algorithm for the GenerateClusterInfoLevel2( ) API. FIG. 5D describes the pseudo code for block 503 of FIG. 5A. The GenerateClusterInfoLevel2( ) API takes all the distinct supplier names after combining them in first level and sends them for grouping in the second level. The steps involved in the API are as follows: Tokenize every line using tab delimiter. Continue if the number of tokens in the name is not more than five. Read the cleaned description, abbreviation flag and the record ID from the first level for each line. Pass on the read information to the 'Add2ClusterLevel2(Supplier, record_id_level1, abbflag)' API. Close the associated files. FIG. 5E illustrates an exemplary algorithm for the Add2ClusterLevel2(Supplier, record_id_level1, abbflag) API. FIG. 5E describes the pseudo code for block 504 of FIG. 5A. This API uses the sound code for each distinct supplier after combining them in the first level. This API groups together all supplier names whose sound code is the same, insensitive to the order of words in the name. For example "hewlette Packard" and "packerd hewlet" will be clubbed together. The API involves the following steps: Tokenize the supplier name using space delimiter. If the abbreviation flag for the supplier name is true, add the first token into the set of sound of token. If the abbreviation flag is not set to true and if the token count is one, then the sound code of the first token is found and if the sound's length is greater than four, then add sound to set of sound of token. If the token count is not equal to one, then add the token itself into set of sound of token. For the remaining tokens, determine sound code for each token. If the length of 'sound code' is greater than two, then add 'sound code' to set of sound of token. If the length of 'sound code' is not greater than two, then add token itself into set of sound of token. Concatenate all elements of set of sound using 'space' delimiters. Search the resulting string called the 'SoundString' in the database map 'mapLevelSecond2First'. If the search result is positive, write the first level record ID and the found record ID in the map into a temporary file. If the search result is negative, write the first level record twice, the supplier name and the abbreviation flag to the temporary file and add the first level record ID and the 'SoundString' of the string into the database map 'mapLevelSecond2First'.

FIG. 5F illustrates an exemplary algorithm for the GenerateTempClusterInfoForLevel3( ) API. FIG. 5F describes the pseudo code for block 505 of FIG. 5A. This API reads all distinct supplier names after the second level and sorts the supplier names using quick sort. After sorting, the supplier names are written into a file for further processing. The API involves the following steps: In GeneralTempClusterInfoForLevel3( ) API, each line of the temporary file 'FILE2TEMP' is deciphered to determine second level record ID (record_id_level2), supplier name, and abbreviation(Abb) flag status. 'Abb' flag and 'record_id_level2' are concatenated to get 'AbbRecord_id_level2'. AbbRecord_id_level2 is added into a list and the suppliers' name into another list. The two lists based on one supplier list are sorted in increasing order. All the 'AbbRecord_id_level2' and corresponding suppliers' names are recorded into file FILE2 and file FILE2TEMP is closed.

FIG. 5G illustrates an exemplary algorithm for the 'GenerateClusterInfoLevel3( )' API. FIG. 5G describes a part of pseudo code for block 506 of FIG. 5A. This API accepts all distinct supplier names after the step of FIG. 5E i.e. after sorting the names in the second level. This API performs the following tasks:

Step0. Consider all distinct supplier names after the second level.

Step1. Send these to block 508 of FIG. 5A.

Step2. Find a group "g" of possible similar supplier names using block 507.

Step3. For all names in "g", take two names and calculate a matching score using block 510. If the score is greater than threshold for third level, then combine those names in third level; else if the threshold is more than the threshold for fourth level, combine those names in the fourth level.

Step4. Repeat Step3 till there is no possibility of further matching of different supplier names in group "g".

Step5. Go to Step2 for finding the next group. If there is no further group available i.e. if all the names are exhausted, then exit.

FIG. 5H illustrates an exemplary algorithm for the Add2ClusterLevel3(supplier, Record_id_level2, AbbFlag) API. FIG. 5H describes the pseudo code for block 508 of FIG. 5A. This API is called by the block 506. This API creates groups of possibly similar supplier names and calls block 507 and 509 to find similar supplier names for third and fourth level.

FIG. 5I illustrates an exemplary algorithm for the Boolean CanBeGrouped(Word1, Word2) API. FIG. 5I describes the pseudo code for block 507 of FIG. 5A. This API takes two names and determines whether they can be added into a group of similar names. In this API, 'minLen' has smaller length of word1 and word2. 'prefixLen' has the longest prefix match between word1 and word 2. If 'prefixLen' is greater than three, then return true. If 'prefixLen/minLen' is greater than 0.5 then return true, else return false.

FIG. 5J illustrates an exemplary algorithm for the Process-CurrentGroup( ) API, represented as a flowchart in FIG. 3B. FIG. 5J describes the pseudo code for block 509 of FIG. 5A. This API takes a group of possibly similar supplier names and then determines the actual similar name, for the third and fourth level, by calling block 510 and applying the threshold of third and fourth level on the matching score. The API involves the following steps: All the supplier names in the group are traversed. The supplier names of the group are matched with one another sequentially by calculating the matching score using the algorithm 'SupplierMatchScore'. If the matching score between two supplier names is greater than the threshold for the third level, for example a threshold of 0.7, the third level record ID of the second supplier name, is updated with the record ID of the first supplier name. Otherwise, the fourth level record ID of the second supplier name is updated with the record ID of the first supplier name. If ten consecutive supplier names do not get a matching score that is greater than the threshold, the execution jumps to first step, where all the supplier names in the next group are traversed.

FIGS. 5K^A and 5K^B illustrate an exemplary algorithm for the SupplierMatchScore(Supplier1, Supplier2, Sound1, Sound2, AbbAflag1, AbbFlag2) API. FIGS. 5K^A and 5K^B describe the pseudo code for the block 510 of FIG. 5A. This API calculates the matching score of two supplier names. This API takes two supplier names, the sound codes, and the abbreviation flags indicating abbreviations present in the names. Then by calling the blocks 511 and 512, the API calculates the matching score.

Here, Supplier1=list of tokens of Supplier 1;
Supplier2=list of tokens of Supplier 2;
Sound1=list of sound of tokens of Supplier 1; and
Sound2=list of sound of tokens of Supplier 2;

The 'SupplierMatchScore(Supplier1, Supplier2, Sound1, Sound2, AbbAflag1, AbbFlag2)' API includes the list of tokens of any two supplier names, list of sound of tokens of the two supplier names and abbreviation flags of the two supplier names in the parameter list. The API also includes an API for determining the Levenshtein distance between two supplier name strings. The 'SupplierMatchScore' API returns a final score for the third level in the deduplication process, where the final score may be compared with a set threshold of 0.7.

FIG. 5L illustrates an exemplary algorithm for the FuzzyMatchTwoString(One, Two, Sound1, Sound2) API. FIG. 5L describes the pseudo code for block 511 of FIG. 5A. This API takes two supplier names and their sound codes and calculates a matching score. This API considers individual tokens of two supplier names, the sound codes of the tokens, the Porter Stem of the tokens (PS1 and PS2), the length of Porter Stem of the tokens, the Levenshtein distance (LD), the Levenshtein distance (LD)score, the PrefixSoundScore and the PrefixScore.

Here, $LDScore=1.0-2*LD/MaxLen2$, where MaxLen2=maximum(PSLen1, PSLen2), where PSLen1 and PSLen2 are length of Porter Stem of the two tokens.

Here, PrefixSoundScore=(Length of largest matching prefix of Sound1, Sound2)/Length of Sound2, where Sound1 and Sound2 are sound codes of the tokens.

Here, PrefixScore=(Length of largest matching prefix of PS1, PS2)/MaxLen2.

The return value may be the 'PrefixSoundScore' or 'PrefixScore' or zero depending upon the calculated values of the 'PrefixSoundScore' and the 'PrefixScore'. The scores depend on the match of the words or sound codes of the words or abbreviations.

FIG. 5M illustrates an exemplary algorithm for the FuzzyMatchSizeOne(One, Two, Sound1, Sound2) API. FIG. 5M describes the pseudo code for block 512 of FIG. 5A. This API takes two supplier names having single words and their sound codes. This API determines the matching score for these supplier names. This API considers a list of tokens of the two supplier names, a list of sound codes of the tokens, the Levenshtein distance, the Levenshtein distance (LD)score, the PrefixSoundScore and the PrefixScore.

$$LDScore=1.0-2*LD/MaxLen2;$$

Where MaxLen2=maximum(Len1, Len2), where Len1=Length of the list of tokens of the first supplier name; Len2=Length of list of tokens of the second supplier name. PrefixSoundScore=(Len of largest matching prefix of Sound1, Sound2)/Len of Sound2, and
PrefixScore=(Length of largest matching prefix of One, Two)/MaxLen2.

The return value may be the 'PrefixSoundScore' or 'PrefixScore' or zero depending upon the calculated values of the 'PrefixSoundScore' and the 'PrefixScore'.

FIG. 6 illustrates an exemplary output of the supplier deduplication engine normalized in the form of a table. The output illustrates a table showing the grouping results at each level. The first two columns are the supplier names and their corresponding record IDs. Grouping in each level is accomplished by assigning the same record IDs to supplier names that have a matching score greater than the set threshold for that level. Initially all the supplier names are given separate original record IDs. As the deduplication process progresses in levels, the record IDs for matched supplier names are made identical. The sample output showing data relationship is in a tabular arrangement and is to be considered as exemplary as this data relationship may be shown in various arrangements.

The method and system of the present invention has been described in the context of processing and deduplication of supplier related information in a database. It will be readily apparent to those skilled in the art that the same method and system of the present invention can be extended to process and deduplicate any type of human readable and intelligible data encompassing all kinds of databases.

It will be readily apparent to those skilled in the art that the various methods and algorithms described herein may be implemented in a computer readable medium, e.g., appropriately programmed for general purpose computers and computing devices. Typically a processor, for e.g., one or more microprocessors will receive instructions from a memory or like device, and execute those instructions, thereby performing one or more processes defined by those instructions. Further, programs that implement such methods and algorithms may be stored and transmitted using a variety of media, for e.g., computer readable media in a number of manners. In one embodiment, hard-wired circuitry or custom hardware may be used in place of, or in combination with, software instructions for implementation of the processes of various embodiments. Thus, embodiments are not limited to any specific combination of hardware and software. A processor means any one or more microprocessors, Central Processing Unit (CPU) devices, computing devices, microcontrollers, digital signal processors, or like devices. The term "computer-readable medium" refers to any medium that participates in providing data, for example instructions that may be read by a computer, a processor or a like device. Such a medium may take many forms, including but not limited to, non-volatile media, volatile media, and transmission media. Non-volatile media include, for example, optical or magnetic disks and other persistent memory volatile media include Dynamic Random Access Memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during Radio Frequency (RF) and Infrared (IR) data communications. Common forms of computer-readable media include, for example, a floppy disk, a flexible disk, hard disk, magnetic tape, any other magnetic medium, a Compact Disc-Read Only Memory (CD-ROM), Digital Versatile Disc (DVD), any other optical medium, punch cards, paper tape, any other physical medium with patterns of holes, a Random Access Memory (RAM), a Programmable Read Only Memory (PROM), an Erasable Programmable Read Only Memory (EPROM), an Electrically Erasable Programmable Read Only Memory (EEPROM), a flash memory, any other memory chip or cartridge, a carrier wave as described hereinafter, or any other medium from which a computer can read. In general, the computer-readable programs may be implemented in any programming language. Some examples of languages that can be used include C, C++, C#, or JAVA. The software programs may be stored on or in one or more mediums as an object code. A computer program product, comprising computer executable instructions embodied in a computer-readable medium, comprises computer parsable codes for the implementation of the processes of various embodiments.

Where databases are described, such as the 'spend' database, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats including relational databases, object-based models and/or distributed databases could be used to store and manipulate the data types described herein. Likewise, object methods or behaviors of a database can be used to implement various processes, such as those described herein. In addition, the databases may, in a known manner, be stored locally or remotely from a device that accesses data in such a database.

The present invention can be configured to work in a network environment including a computer that is in communication, via a communications network, with one or more devices. The computer may communicate with the devices directly or indirectly, via a wired or wireless medium such as the Internet, Local Area Network (LAN), Wide Area Network (WAN) or Ethernet, Token Ring, or via any appropriate communications means or combination of communications means. Each of the devices may comprise computers, such as those based on the Intel®, Pentium®, or Centrino™ processor, that are adapted to communicate with the computer. Any number and type of machines may be in communication with the computer.

The foregoing examples have been provided merely for the purpose of explanation and are in no way to be construed as limiting of the present method and system disclosed herein. While the invention has been described with reference to various embodiments, it is understood that the words, which have been used herein, are words of description and illustration, rather than words of limitation. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

The invention claimed is:

1. A method for deduplication and grouping similar supplier names from a plurality of supplier names, comprising:
   correcting syntactical errors in said supplier names;
   grouping the supplier names after said step of correcting syntactical errors;
   capturing abbreviations of the supplier names;
   correcting ordering, pronunciation and stemming errors in the supplier names;
   calculating a name matching score between two of said supplier names using a matching algorithm, comprising the steps of:
      grouping supplier names based on the first set of characters in the supplier names;
      calculating a word matching score between corresponding words in two of said supplier names, comprising:
         determining stems of said corresponding words;
         determining sound codes of said determined stems using a modified metaphone algorithm;
         determining a Levenshtein distance between said sound codes;
         calculating a prefix score using said stems and calculating a sound score using said sound codes;
         calculating a Levenshtein distance score using said determined Levenshtein distance and length of larger of said corresponding words:
         selecting one of said prefix score, said sound score and said Levenshtein distance score as said word matching score based on comparisons with a set threshold;
      calculating said name matching score between two of said supplier names based on said word matching score; and
   comparing said name matching score with a threshold value to determine a match, and grouping said supplier names based on said match.

2. The method of claim 1, further comprising the step of applying manual intervention to make a final decision.

3. The method of claim 1, wherein said grouping is agglomerative and the grouping result is normalized in the form of a table.

4. The method of claim 3, wherein said agglomerative grouping is performed in a plurality of levels.

5. The method of claim 4, wherein the first level out of said plurality of levels comprises correcting said syntactical errors and capturing said abbreviations.

6. The method of claim 4, wherein the second level out of said plurality of levels comprises handling said order of words, said pronunciation errors and said stemming errors.

7. The method of claim 4, wherein the third level out of said plurality of levels comprises grouping of clusters created in said second level using approximate string matching criteria.

8. The method of claim 7, wherein said string matching criteria comprises said Levenshtein distance scores, position of matching and non-matching characters, number of words, length of words, etc.

9. The method of claim 4, wherein the fourth level out of said plurality of levels comprises manual verification in order to verify the accuracy in grouping and identify probable matches in supplier names.

10. The method of claim 4, further comprising the step of setting threshold values for all said levels of grouping of supplier names.

11. The method of claim 7, further comprises the steps of comparing said matching scores with said set thresholds, and if the matching score is greater than the set threshold, said supplier names are merged in third level.

12. The method of claim 1, wherein the number of words in said supplier names and the number of words matching between said two supplier names is considered for determining name matching scores between the two supplier names in said matching algorithm.

13. The method of claim 1, wherein the position of mismatching characters is considered for determining said word matching scores between said two supplier names in said matching algorithm.

14. The method of claim 1, wherein the length of each word present in said supplier names is considered in said matching algorithm.

15. The method of claim 1, wherein small sub groups of supplier names are created based on a similar first set of characters, wherein said step of creating small sub groups eliminates unnecessary matches.

16. The method of claim 1, wherein said supplier names are grouped by assigning same record identifiers to matched supplier names at different levels of grouping, whereby each group comprises a unique identifier.

17. The method of claim 1, wherein common words and word forms in said supplier names are ignored before grouping the supplier names.

18. A computer program product comprising computer executable instructions embodied in a non-transitory computer-readable medium, said computer program product including:
- a first computer parsable program code for correcting syntactical errors in supplier names;
- a second computer parsable program code for grouping the supplier names after said step of correcting syntactical errors;
- a third computer parsable program code for capturing abbreviations of the supplier names;
- a fourth computer parsable program code for correcting ordering, pronunciation and stemming errors in the supplier names;
- a fifth computer parsable program code of a matching algorithm to calculate a name matching score between two of said supplier names, comprising:
  - a sixth computer parsable program code for grouping supplier names based on the first set of characters in the supplier names to avoid unnecessary squared n matching;
  - a seventh computer parsable program code for calculating a word matching score between corresponding words in two of said supplier names, comprising:
    - an eighth computer parsable program code for determining stems of said corresponding words;
    - a ninth computer parsable program code for determining sound codes of said determined stems using;
    - a tenth computer parsable program code for determining a Levenshtein distance between said sound codes;
    - a eleventh computer parsable program code for calculating a prefix score using said stems and calculating a sound score using said sound codes;
    - a twelfth computer parsable program code for calculating a Levenshtein distance score using said determined Levenshtein distance and length of larger of said corresponding words;
    - a thirteenth computer parsable program code for selecting one of said prefix score, said sound score and said Levenshtein distance score as said word matching score based on comparisons with a set threshold;
  - a fourteenth computer parsable program code for calculating said name matching score between two of said supplier names based on said word matching score; and
- a fifteenth computer parsable program code for comparing said name matching score with a threshold value to determine a match, and grouping said supplier names based on said match.

* * * * *